C. J. EMERSON AND P. W. BRIDGMAN.
METHOD OF AND APPARATUS FOR RAPID WEIGHING IN ANALYTICAL BALANCE.
APPLICATION FILED DEC. 27, 1915.

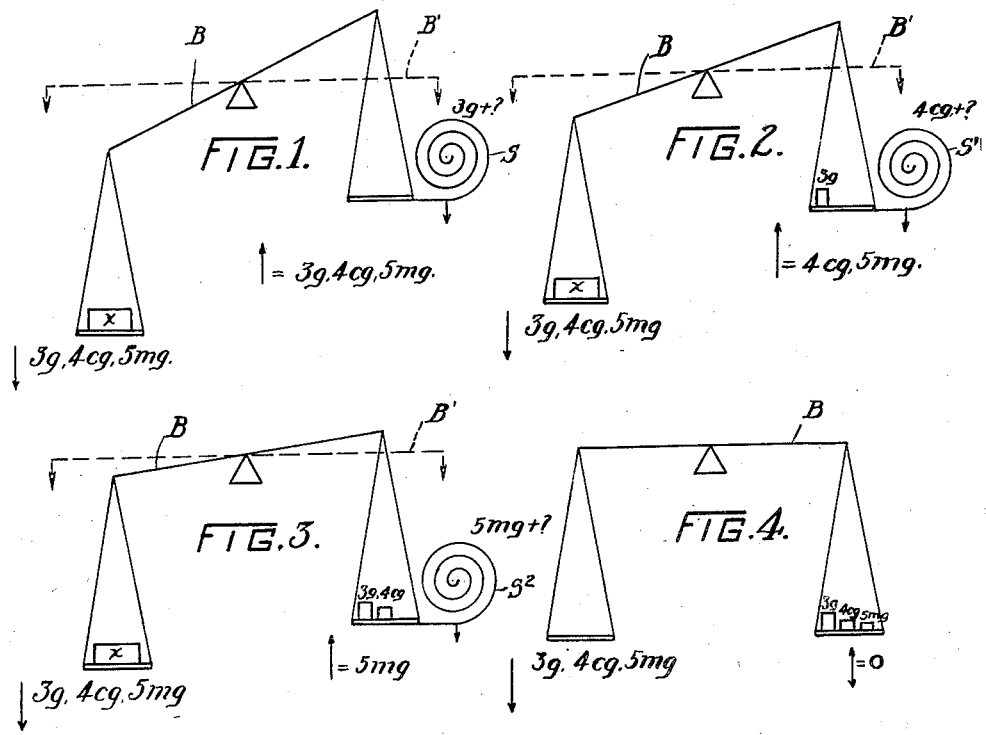
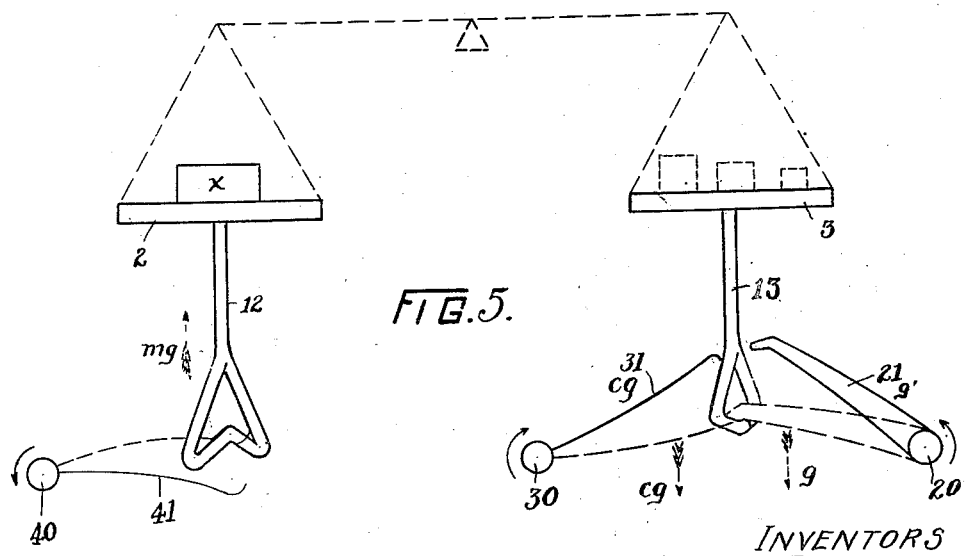

1,377,569.

Patented May 10, 1921.
2 SHEETS—SHEET 2.

INVENTORS
CHARLES J. EMERSON.
PERCY W. BRIDGMAN.
By
ATTORNEY

UNITED STATES PATENT OFFICE.

CHARLES J. EMERSON, OF PROVIDENCE, RHODE ISLAND, AND PERCY W. BRIDGMAN, OF CAMBRIDGE, MASSACHUSETTS, ASSIGNORS TO EMERSON APPARATUS COMPANY, OF BOSTON, MASSACHUSETTS, A CORPORATION OF RHODE ISLAND.

METHOD OF AND APPARATUS FOR RAPID WEIGHING IN ANALYTICAL BALANCE.

1,377,569.   Specification of Letters Patent.   Patented May 10, 1921.

Application filed December 27, 1915. Serial No. 68,637.

*To all whom it may concern:*

Be it known that we, CHARLES J. EMERSON and PERCY W. BRIDGMAN, citizens of the United States, residing at Providence, county of Providence, State of Rhode Island, and Cambridge, county of Middlesex, Commonwealth of Massachusetts, respectively, have invented certain new and useful Improvements in Methods of and Apparatus for Rapid Weighing in Analytical Balance, of which the following is a specification.

This invention relates to weighing, and particularly to such exact weighing as is required in laboratory analysis or in assay work. In such work, strict accuracy is only obtainable on the counterbalance principle, in a balance, and the mechanical fulcrum of such counterbalance must be of extreme nicety as in the so called knife edge of the analytical or assay balance. As the counterbalance principle of weighing as at present practised, involves a try and fit method, it has necessarily been a slow and tedious process, and where repeated weighing has been required, it has been a severe tax on the strength and patience, and one of the most arduous duties of the laboratory.

Our invention embodies a mechanism by which weighing on the counterbalance principle may be accomplished in successive steps, each of these steps being of less percentage accuracy than the finally desired weight, but each of the steps being capable of accomplishment with so great speed that the total time occupied by the successive steps is less than would be consumed if the steps were dispensed with. Our invention is based on the well known fact that many devices capable of very rapid weighing are not capable of great accuracy. An ordinary spring balance for example weighs with great speed, the weight being indicated automatically by placing the weight on the scale pan, but it is not capable of high precision owing to temperature effects on the elasticity of the spring, elastic hysteresis, elastic after effects, etc. Furthermore, the possible accuracy of a properly constituted spring balance is not an absolute matter of so many grams error, but is a percentage accuracy on the total weight. A spring balance properly constructed to weigh a maximum of 100 grams will give readings correct to let us say 0.5 gram, whereas a spring balance constructed for a maximum of one gram will read correctly to .005 gram. The successive steps in weighing made possible by our mechanism have the same properties as a weighing by a spring balance; that is, high speed combined with an accuracy which is a fixed proportional part of the total weight to be indicated by the step.

The object of our present invention is to facilitate weighing so as to effect a saving of time and labor and also to afford a decrease in the wear and strain on the delicate mechanism of the counterbalance used. Crude approximations of weight are very readily obtained, especially by expert operatives, but the difficulty of securing accurate balance comes in the successive steps of the weighing where the unbalanced increment becomes more and more minute. The principle of our invention depends upon the approximate determination of the unbalanced difference in the equilibrium of the balance. In other words, to successively determine in the balance itself its approximate degree of unbalance in terms of lesser units of a related scale in successive related steps through which that degree of unbalance may be corrected. For example, in a balance using the metric system we first find the degree of unbalance in grams, counterweight with the gram weight indicated, determine the degree of unbalance in centigrams, counterweight with centigram weights and then determine the unbalance in tenths of milligrams, and then if desirable this final indication may be checked by counterbalancing.

In perfecting our invention we preferably accomplish it by providing means by which the degree of unbalance in the balance itself may be successively ascertained by independent means, each accurate within a predetermined limit and the said limits being successively arranged so as to afford a continuous range of accurate determination. The method therefore consists in successively determining the unbalanced factor of a counterbalance other than by the use of counterweights, and in successively applying to the unbalanced side of the counterbalance approximately that element which is wanted to complete the balance. It must be borne in mind that in order to preserve the balance as a true balance it must be mechanically free from the influence of co-operating parts. This is accomplished in the present invention by members normally independent but capable of selective interposition, temporary combination and subsequent elimination—all without disturbing the constant function of the balance itself as a mechanism.

Our invention provides a method of successively engaging by suitable feelers with elements in the regular type of weighing balance, and in the particular application herein described, this engaging is accomplished through means of suitable extensions attached to the balance, these attachments not to disturb the normal function of the balance. By means of these feeler members a pressure is increasingly applied in countereffect to the weight on the scale pan, until equilibrium is established, which is indicated by the swing of the pointer. By establishing equilibrium in this manner, our mechanism indicates the approximate difference in weight of the two sides of the scale.

Our invention comprises a suitably designed engaging part, to make contact with the balance either directly or on special extensions for the purpose and means of applying said engaging part by hand. Intermediate between the hand control and the engaging part is a flexible unit which serves by means of its elastic operation, to indicate the stress applied.

The stress is applied usually by rotating the hand control above mentioned, and the amount of rotation of this hand control is indicated by a pointer on a circular, graduated disk. This disk is graduated in such a manner that the position of the pointer on the same indicates the excess weight existing on that pan of the balance containing the object to be weighed.

For the purposes of illustration of our method and the principles of apparatus suitable for such weighing, we have shown in the accompanying drawing both a form of balance found capable of satisfactory construction and service and diagrammatic indications of the steps developed in such a weighing as is herein involved.

In the drawings:

Figures 1 to 4 indicate successive steps in a weighing.

Fig. 5 is a further development of the diagram but indicating the relation of the preferred mechanism.

Figures 6, 7:
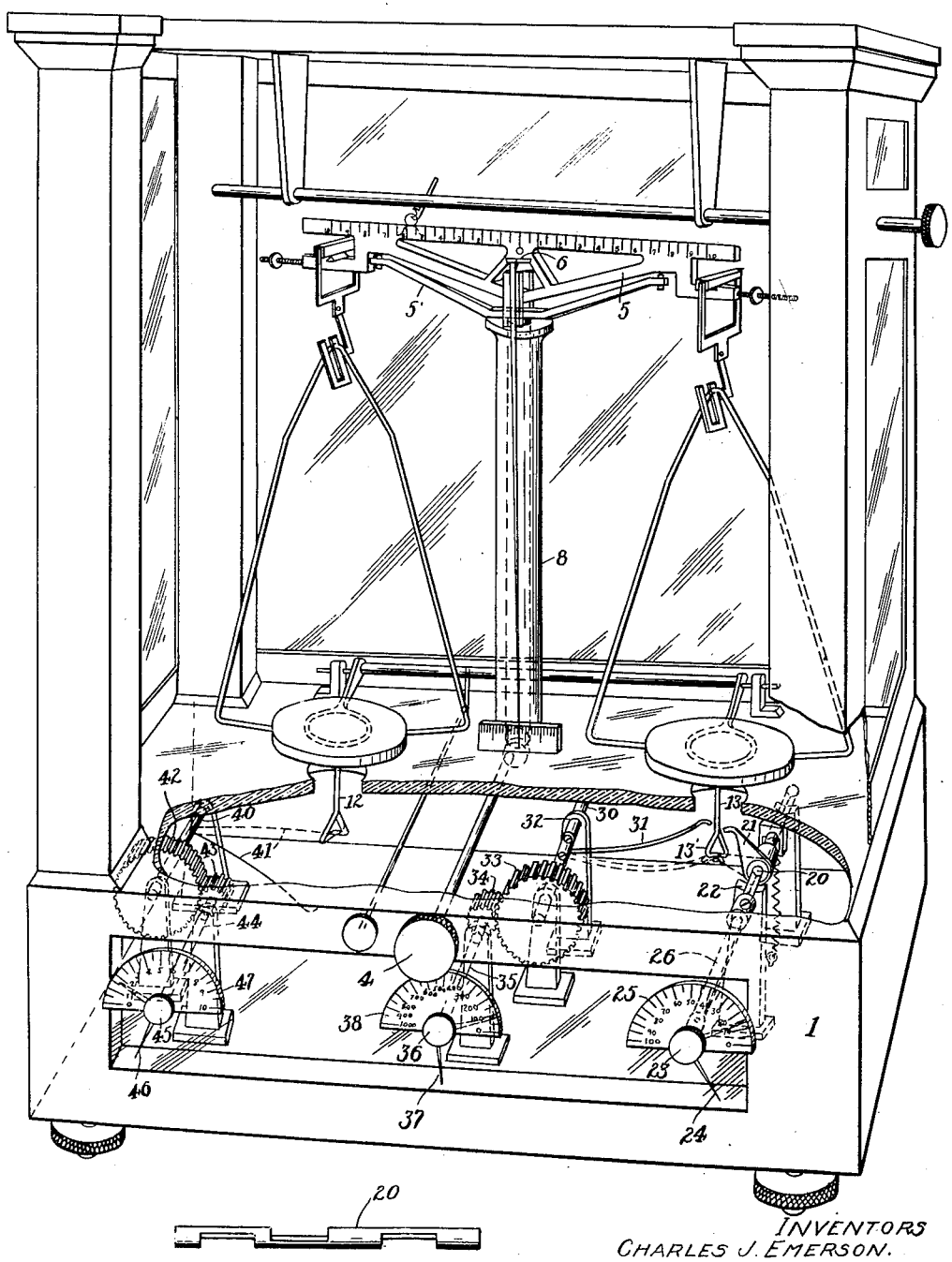
Fig. 6 is a perspective view of a balance built in accordance with our invention.
Fig. 7 is a detail view of a shaft.

In Fig. 1, we have indicated a balance having a substance to be weighed X, which for the purpose of illustration may be taken as 3 g, 4 cg. 5 mg. The force exerted on the left in Fig. 1 is downward and of the weight indicated. The state of unbalance on the opposite side is upward and with the same weight. In order to ascertain the approximate state of balance, a suitable element, as for example a spring S, may be brought into action, this element being capable of indicating in grams with reasonable accuracy a considerable variation of weight. The dotted horizontal line $B^1$ indicates an approximate state of balance with the spring S exerting a pull equal to 3 gs. plus. In Fig. 2, we have indicated in full lines the same scale, but with a 3 g. weight indicated as 3 g. in the weight pan of the balance which leaves the actual degree of unbalance still present to an extent of 4 cgs. plus 5 mgs. The horizontal dotted line $B^1$ in Fig. 2 indicates a state of approximate balance effected through the 3 g. weight in the pan plus the action of a somewhat lighter spring $S^1$ exerting a pull of 4 cg. plus. Fig. 2 therefore indicates the actual degree of unbalance as being 4 cgs. plus. In Fig. 3, there is diagrammatically illustrated a state of unbalance with a 4 cg. weight added in the weight pan to the 3 g. weight already placed there. There would therefore be an actual degree of unbalance or an upward tendency of the weight pan equal to 5 mgs. The horizontal dotted line $B^1$ indicates an approximate state of balance affected by the weights 3 g. and 4 cg. in the pan plus the action of a spring $S^2$ exerting a pull of 5 mg. In the instance shown the spring $S^2$ would be exerting a downward pull of 5 mgs. This weight is therefore added to the weight pan shown in Fig. 4 at which time, theoretically, the state of unbalance is eliminated and equilibrium is secured.

Before going into the description of the mechanism, a reference may be made to Fig. 5, which supplements Figs. 1 to 4. In this figure, the scale pans 2 and 3 are shown with downward stirrups 12 and 13 of equal weight. Adjacent to the stirrup 13 are two shafts 20 and 30. Each shaft has an arm 21 and 31 respectively capable as indicated of being rotated into contact with the stirrup 13 for the purpose of determining by resilience the factors indicated by the spring S and $S^1$ shown in Figs. 1 and 2 respectively. Associated with the scale pan 2 and the stirrup 12 is a corresponding shaft 40 having an arm 41. As this element is effective on the opposite side of the fulcrum and as indicated by the arrow the arm 41 has an upward contacting movement. Each one of the arms 21, 31, and 41 have an effective displacing capability of the nature of the springs S, $S^1$, and $S^2$, (Figs. 1 to 4 inclusive) as above described. That is to say, the arm 21 is governed by a torsion piece of spring 26 (Fig. 6) interposed between the knob 23 and the shaft 20. The arm 31 is itself a spring having the desirable uniform sensitiveness to variations in weight of one centigram. The arm 41 is also a spring of very great flexibility and sensitiveness to variations of weight of one-tenth milligram.

Coming now to the part of our device which we have shown as an illustrative embodiment, we have shown a balance having a suitable base 1, preferably with a transparent deck, and supporting a column 8 having a beam 5 fulcrumed at 6 with the usual knife edge bearing and having the usual beam release $5^1$. All of these elements of the scale and the accompanying features are standard constructions of which the details are not herein involved. Within the base 1 and adjacent to the stirrup $13^1$ which is let through an opening in the transparent top, is mounted a shaft 20 having an arm 21. The shaft is mounted on suitable knife edge bearings 22 controlled at its outer end with a knurled knob 23, having a pointer 24 passing suitable graduations reading for example in grams on a dial 25. Between the arm 21 and the knob 23 is a torsion spring 26 which yields when upon the rotation of the shaft the arm 21 engages the stirrup $13^1$ as indicated in dotted lines. On the opposite side of the stirrup 13 is journaled another shaft 30 having an arm 31. Preferably the arm 31 is a spring arm having a flexibility suitable for the indication of centigrams. The shaft 30 is journaled in suitable bearings 32 and is provided with a gear 33 which is meshed with a pinion 34 on a shaft 35 which has a knurled knob 36 carrying a pointer 37 capable of being turned past suitable graduations preferably in centigrams on a scale 38. Adjacent to the stirrup 12 is a shaft 40 journaled and having a gear 42 with a pinion 43 on a shaft 44 having a knurled knob 45 turning a pointer 46 past suitable graduations, preferably in milligrams (or tenths) on a dial 47. On the shaft 40 is mouted a slender spring arm 41 capable of upward movement brought by the knob through the gearing to come into contact with the horizontal bar of the stirrup 12. This arm 41 is a very light spring having a flexibility capable of indicating displacement in milligrams (or tenths).

Our invention has a particular advantage in that the attachments as used with an analytical balance are so designed that in indicating and approximating the weights the mechanisms engage with the extensions on the analytical balance, and then after the indications and readings are made, completely disengage from the extensions of the analytical balance, leaving the balance intact with its ordinary arrangement and equipment suitable to be used in the regular manner.

This contact feature has at once the apparent advantage that the balances can be used either with or without the attachments as desired by the operator; and at all times any uncertainty as to the accuracy either of operation or of the device itself can be ascertained by the balance itself, used in the regular manner with the indicating attachments of our invention disengaged.

The operation of making a weighing with the use of a balance such as is shown in Fig. 6 is as follows: With a given object whose weight is to be determined placed on the left scale pan 2, the thumb screw 23 is rotated toward the left until the finger 21, as shown in its dotted position, comes in contact with the stirrup 13. At this position of the finger 21, the pointer 24 will register zero on the graduated dial 25. At this point the beam release thumb screw 4 is grasped in the left hand and the beam is carefully lowered on to the knife edge bearings. At the same time the knob 23 is rotated to the left until the finger 21 brings suitable pressure on the stirrup 13 to set the balance at equilibrium, as indicated by the pointer 10 in front of the column as it oscillates across the graduated scale $10^1$ at the base of the column.

This pressure which is applied by hand at the knob 23 is transmitted to the finger 21 through the strip of spring steel 26 and the greater the pressure necessary to establish equilibrium in the balance, the further will be the necessary rotation of the thumb screw 23 because of the elasticity of the strip 26. It is the torsion of this spring steel strip 26 which gives the measure of the pressure to offset the state of unbalance, and the magnitude of the rotation is indicated by the pointer 24 on the dial 25. This part of our mechanism registers, with a balance using the metric weights, the whole number of grams of the weighed substance, and the dial 25 is graduated in grams as indicated with a range from 0 to 100.

Upon establishing equilibrium of the balance in the above mentioned manner, the position of the pointer 24 on the graduated dial 25 is noted, and after lifting the scale beam from the knife edges with the thumb screw 4, that number of gram weights is placed on the right scale pan which was indicated by the pointer 24 on the dial. The finger 21 is then rotated to the right by means of the knob 23, to a position entirely disengaged from the stirrup E, as shown in Fig. 6. The knob 36 is now rotated to the left, and in this manner, by means of the train of gears 33, 34, the spring wire finger 31, as shown in its dotted position, is brought in contact with the stirrup 13 as indicated in dotted lines (Fig. 6).

After lowering the scale beam again on to the knife edge bearings, the spring wire finger 31 is caused to exert a pressure on the stirrup 13 until equilibrium is again established, as indicated by the pointer 10, and this pressure of the finger 31 is accomplished by the rotation of the knob 37 and the pressure exerted varies in proportion to the rotation of the shaft 30 which holds this spring wire finger 31.

When equilibrium of the balance is again established, the position of the pointer 37 on the graduated dial 38 is noted. This dial 38 is graduated in centigrams, and the whole number of centigrams as indicated in this manner are placed on the right scale pan after the balance has been lifted from the knife edges in the usual manner.

The spring wire finger 31 is then rotated to the left by a right hand rotation of the knob 36, and in this manner is entirely disengaged from the stirrup 13 as shown in the illustration.

After again lowering beam on to the knife edge bearings, the spring wire finger 41 is made to rotate in a left hand direction by the rotating of the knob 45 in a right hand direction. This action is effected through the train of gears 42 and 43. As the spring wire finger 41, as shown in its dotted position, comes in contact with the bottom of the stirrup 12, an upward pressure is exerted on this stirrup, and this pressure is proportional to the amount of rotation of the shaft 40 which holds this spring wire finger 41. The amount of rotation of this shaft 41 is controlled by the rotation of the knob 45, and this amount is indicated by the position of the pointer 46 on the graduated dial 47. This dial reads in milligrams and tenths of milligrams. The spring wire finger 41 is of extreme fineness, being only a few thousandths of an inch in diameter.

The upward pressure of the finger 41 on the stirrup 12 offsets the remaining degree of unbalance in the balance indicated by the pointer 46. Upon noting the position of the pointer 46 on the dial 47, the position to which the rider 50 is to be brought on the graduated scale beam at 51 is thus indicated. Placing the rider in the usual manner at this ascertained position completes the weighing, which is indicated by the swing of the pointer 10 after the elastic finger 41 is rotated in the right hand direction so as to be entirely disengaged from the stirrup 12.

In the operation of the spring wire fingers 31 and 41, the trains of gears, 33, 34 and 42, 43, respectively, are introduced between the said fingers and the hand control knobs 36 and 45, in order to accomplish a more uniform application of the fingers in question to the stirrups on the scale pans, and also to increase the range of the pointers 37 and 45 on their respective dials with a given amount of bending of the fingers.

Various modifications in the form and construction of our device may obviously be resorted to without departing from the spirit of our invention if within the limits of the appended claims.

What we therefore claim and desire to secure by Letters Patent is:

1. In a weighing apparatus, a balance comprising a beam and pans, a plurality of independent mechanical means, each having an indicator and each reading in different related units, effectively disposed so as to engage and disengage at will with said balance, and so as to indicate the state of unbalance therein.

2. In a weighing apparatus, a balance and a plurality of independent resilient feelers each having an indicator and each reading in different, related units and effectively disposed relative to said balance to indicate a state of unbalance therein.

3. In a weighing apparatus, a balance comprising a beam and pans, a plurality of independent rotatably mounted arms, a resilient member operatively associated with each arm which may engage or disengage at will with the balance, a scale and pointer associated with each arm and indicating, when engaged with the balance, the degree of elastic deformation of the resilient member, and each scale reading in different but related units of weight.

4. In a weighing apparatus, a balance and a plurality of independent resilient feelers, each movably mounted relative to a side of said balance and engageable therewith and an indicator associated with each feeler each having a graduation reading in different units related each to each, successively to indicate the unbalance of the mass in progressively diminishing unit values.

5. In a weighing apparatus, a balance and a plurality of independent resilient feelers, each movably mounted relative to a side of said balance and engageable therewith and an indicator associated with each feeler and having a graduated scale reading in different units related each to each, successively to indicate the unbalance of the mass in progressively diminishing unit values.

6. In a balance, a fulcrum, a beam disposed to balance thereon, a pan on each end of the beam, a stirrup associated with one pan, a rotatable member to one side of and below one of said pans, a device on said member and disposed for stirrup engagement upon rotation, said member and engaging device having a resilience relative to said stirrup.

7. In a balance, a fulcrum, a beam disposed to balance thereon, a pan on each end of the beam, a stirrup associated with one pan, a rotatable member to one side of and below one of said pans, a device on said member and disposed for stirrup engagement upon rotation, said member and engaging device having a resilience relative to said stirrup and a graduated scale readable relative thereto.

8. In a balance, a fulcrum, a beam disposed to balance thereon, a pan on each end of the beam, a stirrup associated with each pan, a plurality of rotatable members to one side and below said pans, a device on each of said members and disposed for stirrup engagement upon rotation, each of said members and engaging devices having a resilience relative to said stirrup, and graduated scales readable relative to said devices and each having a relative unitary differentiation.

9. In a weighing apparatus a balance comprising a beam and pans, a plurality of independent mechanical means, each including an indicator reading in related units of successive differentiation in magnitude and effectively disposed relative to said balance to procure indication of the state of unbalance therein.

10. In an equal arm balance, a fulcrum, a beam and a normally disengaged spring feeler engageable with one end of the beam when the beam is on the fulcrum, and means associated with said spring feeler to indicate the amount of unbalance of the beam and disengageable from the beam to permit free swing thereof when the amount of unbalance thus indicated has been substantially counterweighted.

11. In an equal arm balance, a fulcrum, a beam normally non-contacting said fulcrum but adapted to be balanced thereon, and a normally disengaged hand controlled spring feeler engageable with one end of the beam when the beam is on the fulcrum, means associated therewith to indicate the amount of unbalance of the beam, said feeler being disengageable from the beam to permit free swing thereof when the amount of unbalance indicated by said feeler has been counterweighted.

12. In an equal arm balance, a fulcrum, and a beam disposed to balance thereon, and an independent resilient member disposed for engagement with or disengagement from one side of said beam and when engaged indicating the amount or the degree of unbalance in the arms and when disengaged leaving the balance free to swing to permit an actual equal arm weighing.

13. In an equal arm balance, a fulcrum, and a beam disposed to balance thereon, and an independent hand controlled member disposed for engagement with or disengagement from one side of said beam and when engaged indicating the amount or the degree of unbalance in the arms, and when disengaged leaving the balance free to swing to permit an actual equal arm weighing.

14. In an equal arm balance, a fulcrum, a beam, a normally disengaged spring engageable with one end of the beam when the beam is on the fulcrum to indicate the actual amount of unbalance of the beam and disengageable from the beam to permit free swing thereof when the amount of unbalance thus indicated has been substantially counterweighted, a pointer operatively connected with said spring, and a graduated member associated with said pointer for visually indicating the amount of unbalance.

In testimony whereof we affix our signatures in presence of two witnesses.

CHARLES J. EMERSON.
PERCY W. BRIDGMAN.

Witnesses:
VICTORIA LOWDEN,
MARY WOTHERSPOON.